US00RE37467B1

(19) United States
(12) Reissued Patent
Brasch et al.

(10) Patent Number: US RE37,467 E
(45) Date of Reissued Patent: Dec. 11, 2001

(54) ALERT CONDITION SYSTEM USABLE FOR PERSONNEL MONITORING

(75) Inventors: John J. Brasch, Lincoln; Alan W. Cross, Denton, both of NE (US)

(73) Assignee: Senior Technologies, Inc., Lincoln, NE (US)

(21) Appl. No.: 09/372,404

(22) Filed: Aug. 10, 1999

Related U.S. Patent Documents

Reissue of:
(64) Patent No.: 5,268,670
Issued: Dec. 7, 1993
Appl. No.: 07/771,618
Filed: Oct. 4, 1991

(51) Int. Cl.[7] ..... G08B 13/00
(52) U.S. Cl. ..... 340/541; 340/522; 340/545.3; 340/567; 340/666; 340/691.4
(58) Field of Search ..... 340/541, 522, 340/545.1, 567, 666, 572.1, 573.1, 573.4, 539, 523, 527, 528, 691.1, 331; 348/152, 155; 187/105, 131, 132, 140

(56) References Cited

U.S. PATENT DOCUMENTS 4,095,214 * 6/1978 Minasy ..... 340/572
4,410,884 * 10/1983 Heiland ..... 340/545
4,642,612 * 2/1987 Crump ..... 340/541
4,682,155 * 7/1987 Shirley ..... 340/573

FOREIGN PATENT DOCUMENTS

00377 * 2/1982 (WO) ..... 340/541

* cited by examiner

*Primary Examiner*—Thomas Mullen
(74) *Attorney, Agent, or Firm*—Greer, Burns & Crain, Ltd.

(57) ABSTRACT

To generate an alert signal indicating that an unauthorized subject is in a first region within seven feet of a passageway, a radio transmitter is worn by the subject and received by a receiver at the passageway. A second signal is generated upon satisfaction of a second condition, such as an open door at the passageway, which second signal indicates the likelihood of the subject passing through the passageway. A first display indicates if the first signal is present and a second signal if the second condition occurs.

8 Claims, 5 Drawing Sheets

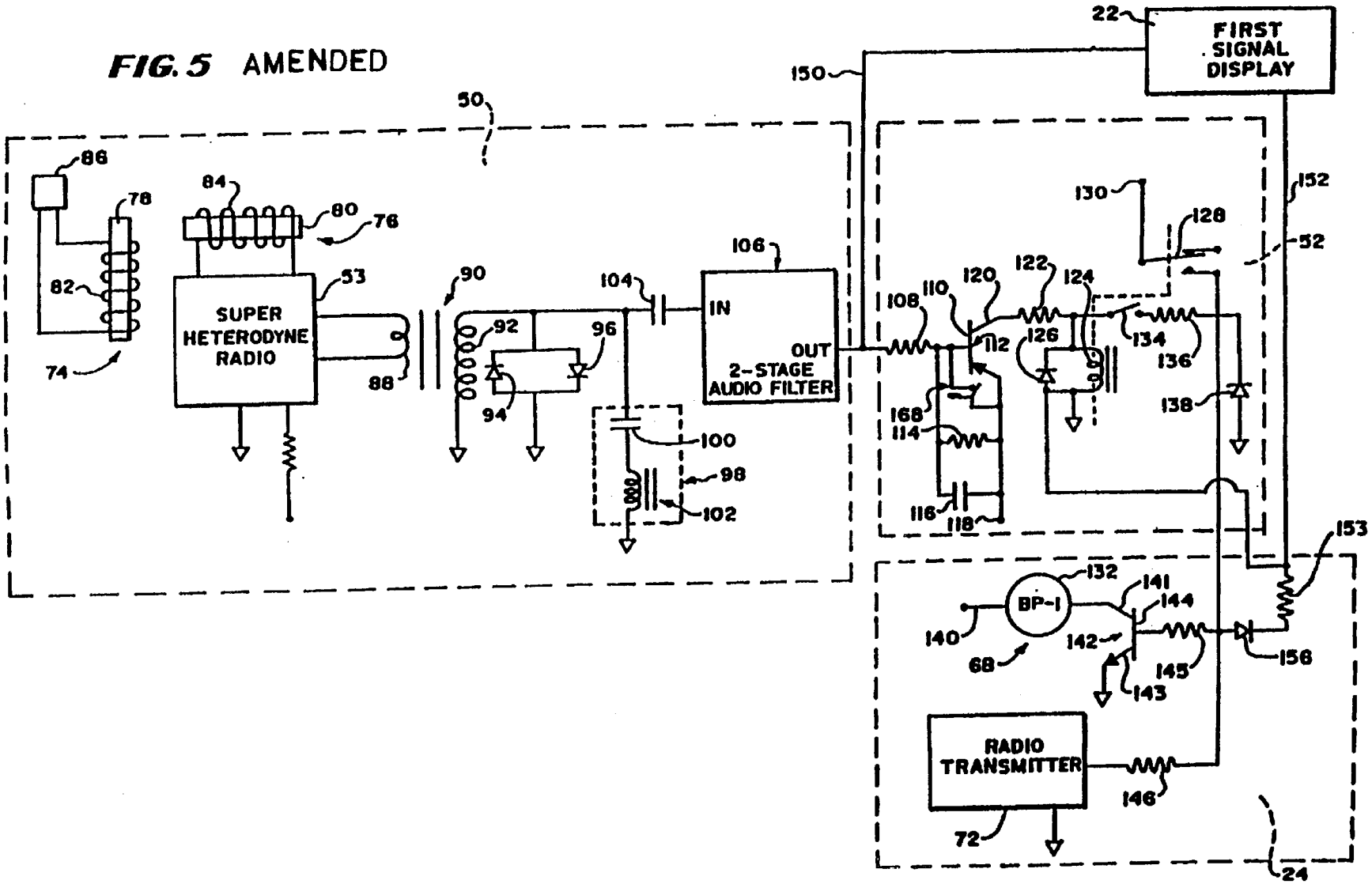
FIG. 5 AMENDED

ALERT CONDITION SYSTEM USABLE FOR PERSONNEL MONITORING

Matter enclosed in heavy brackets [ ] appears in the original patent but forms no part of this reissue specification; matter printed in italics indicates the additions made by reissue.

BACKGROUND OF THE INVENTION

This invention relates to apparatuses and methods for monitoring personnel.

In one class of personnel monitoring system, a detector is positioned near exits or in passageways to determine when a person or an object is moving through the passageway or door. At that time, a signal is transmitted to a monitoring station indicating that a person or object is going through the door. Among other uses, such systems are used as security systems to determine if unauthorized patients are leaving a nursing home or the like. One such system is disclosed in U.S. Pat. No. 4,095,214.

In some such systems, a first signal is generated when the patient enters a first region. If a second condition occurs, such as the opening of a door, an alarm signal is given. A system of this type is disclosed in U.S. Pat. No. 4,682,155. In some of the known systems, a person carries an active device such as a transmitter, and an others, the person carries a passive device which receives signals and retransmits the signals when the person is in a predetermined range of the transmitter. Still other such devices rely upon a pressure pad which may be stepped upon or a combination of a device carried by a person and a location mounted device such as a device that detects the pressure of a foot step or the opening of a door.

The prior art personnel monitoring system of this class may generate a signal when the personnel being monitored are near a passageway but do not provide an alarm or warning unless a monitored person gives further indications of trying to go through the passageway.

The prior art personnel monitoring systems have several disadvantages, such as for example: (1) they do not provide advanced warning that a monitored person may be about to go through the passageway; (2) the signals may be given at a time when the central station doing the monitoring is unattended, thus permitting the persons to proceed a substantial distance before it is detected that they have left: (3) the systems can be defeated by a careful person attempting to avoid detection until the last minute and then quickly proceed through the passageway; and (4) the systems are susceptible to failure because of a temporary malfunction because there may be inadequate warning.

Devices are known which give a plurality of different signals depending on the amount of time that an object is at a particular station. For example, some detectors utilized by drive-ins give one signal when a car is near a service window and another signal if a car remains there unserviced after a particular period of time.

While such a system could be employed to detect a person who is spending a prolonged time attempting to exit through the passageway, they have not been applied in this manner even though they have been available for a substantial number of years in other localities. Moreover, they are not adapted to merely alert personnel to wait for an actual attempt to go through the passageway but instead the second signal is provided only to indicate that someone has been waiting a long time for service.

SUMMARY OF THE INVENTION

Accordingly, it is an object of the invention to provide a novel personnel monitoring system.

It is a further object of the invention to provide a novel method for alerting personnel that an object or a person may shortly attempt to go through a passageway.

It is a still further object of the invention to provide a monitoring system which provides an alert condition indicating that an object or a person is about to pass through or be carried through a passageway and then another distinct signal indicating that the unauthorized person or object has proceeded or is proceeding through the passageway.

It is a still further object of the invention to provide a personnel monitoring system in which one signal or no signal at all is given an unauthorized person is near a passageway unless the object or person dwells before the passageway for a predetermined time, thus indicating a planned attempt to go through the passageway.

In accordance with the above and further objects of the invention, a passageway or a doorway contains first and second regions within which an unauthorized person or object can be detected. A detecting means is provided that can detect the person or object in the first region and can detect a person or object in the second region either by physical actuation of a device or by the presence of the object or the person.

An example of the actuation of a device indicating that a person is in the second region is when a switch is actuated upon opening a door indicating that a person is at the threshold of the doorway. Another example is the actuation of a pressure pad in the doorway. Examples of detecting the presence of an object by the mere presence of the object are: (1) when the object is a transmitter carried by a monitored person, which transmitter triggers a receiver within the second region; (2) when the object is a passive transponder which generates a signal upon receiving a radio signal from a fixed station at the second region; or (3) when a direct detector, such as an infrared sensor, is mounted at a monitored doorway or passageway. Similar detection devices can be used in the first region to provide an alert signal.

In the preferred embodiment, an alert signal is displayed whenever a monitored person is in the monitored area and an alarm signal is provided only after an alert signal has been generated and a door is opened. However, in another embodiment, a signaling device is provided which gives an alert signal only if the person or object dwells near the passageway for a predetermined time. There may be no signal if the person or object is there for a shorter time, or two distinctive signals may be used, one for only a short time and a different one when the time before the passageway is increased. Another signal is provided, different than the alert signal, to indicate that a person is actually in the second region or passing through the second region, and this signal may follow the alert signal or may be provided within an alert signal in those instances where the person or object quickly moves through the first region and the second region.

The signals may be provided by plurality of different readout devices such as a plurality of lamps, one of which indicates an alert condition and one of which indicates movement through the passageway by the unauthorized object or person or a single device such as a light or an audible alarm may be utilized with different modes of signaling, such as a periodic signal as an alert condition and a steady signal when an object or person goes through the passageway. Moreover, the alert signal may actually be video presentation of a person at the doorway triggered by the alert condition or a combination of different audible and visual signals, so that the alert condition is a visual presentation of the doorway and the signal indicating passage through the doorway is a change in the presentation provided by the video image, although it is desirable to have additional signals likely to attract attention to the video screen. An alarm may be provided at the second region to serve as a warning to the person being monitored.

In operation, as a patient or another person carrying an unauthorized object approaches a doorway or other monitored passageway, a signal is generated. A monitoring station provides the alert alarm if the person is in a predetermined region before the monitored location. In one mode of operation, the alarm is only given after the signal has persisted for a predetermined period of time such as more than three seconds and preferably ten seconds. In this embodiment, if the monitored person or object dwells in the region before the door less than the selected time, either no signal is given or a signal different than the alert signal is given. If the object has moved through the door or the patient passes through the door, a different signal is given indicating an alarm condition.

Different signaling devices may be utilized or the same signaling device with different presentations to indicate at least one alert condition and one alarm condition. If desired, a plurality of different alert conditions can be provided for different distances from the monitored location or for different periods of time within the region in front of the entrance, although in the preferred embodiment, there is only one alert condition which starts if a patient is within four or five feet of the passageway and a second alarm condition is given if the door is opened by an unauthorized patient.

From the above description, it can be understood that the alert system of this invention has several advantages, such as: (1) it provides a warning that will cause persons monitoring a passageway to be alert to a possible exit of an unauthorized person or object; (2) it can compensate to some extent for a malfunction of the alarm condition because persons will be put on guard by the alert condition; and (3) it is inexpensive and reliable, utilizing mainly parts and equipment already present in many existing monitoring systems to provide the extra alert condition.

SUMMARY OF THE DRAWINGS

The above noted and other features of the invention will be better understood from the following detailed description when considered with reference to the accompanying drawings in which:

FIG. 5 is a schematic circuit diagram of the embodiment of FIG. 2;

DETAILED DESCRIPTION

Figure 1:
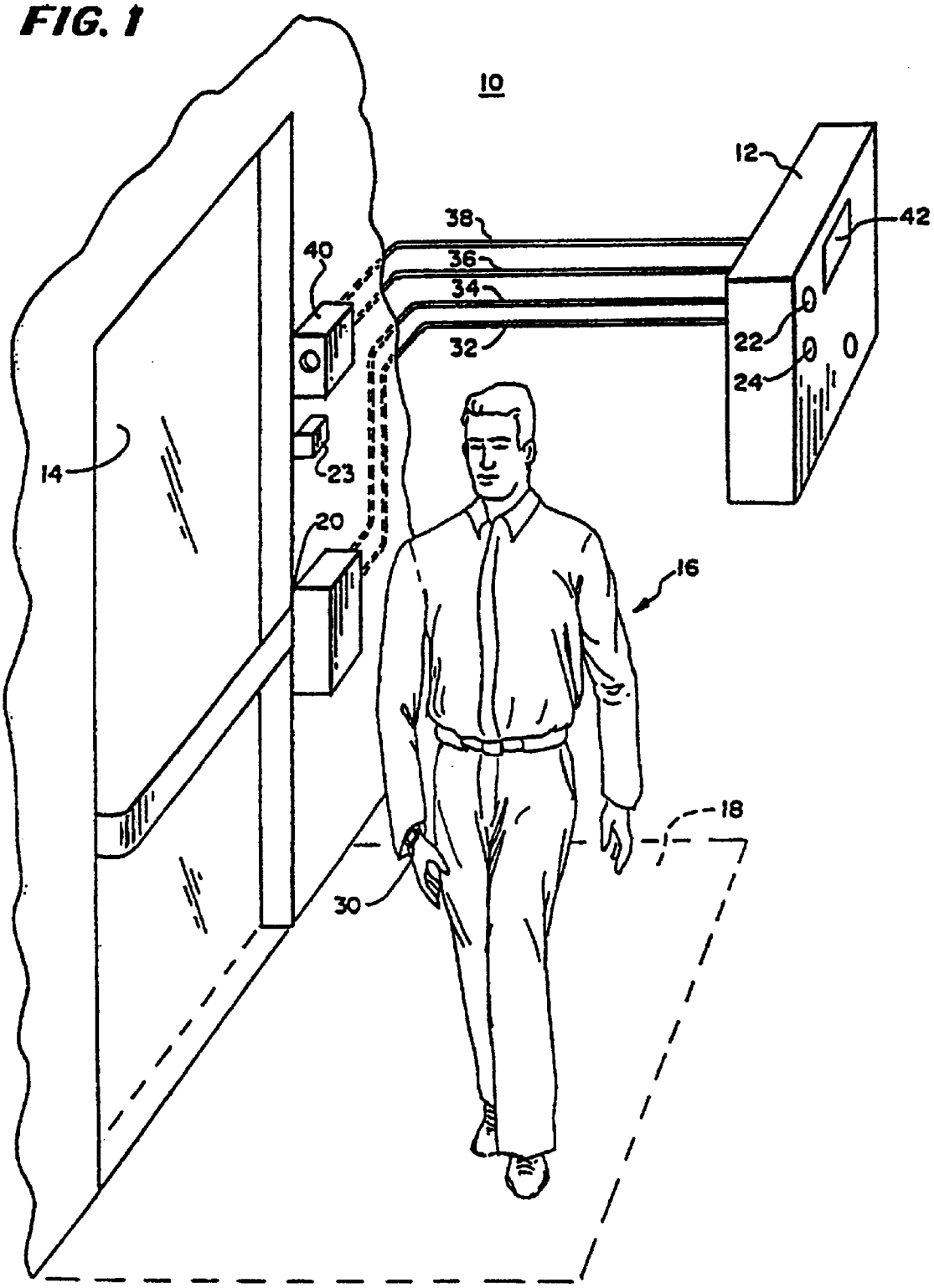
FIG. 1 is a fragmentary simplified perspective view of an alert system in accordance with an embodiment of the invention.

In FIG. 1, there is shown an alert system 10 having a monitoring station 12, a monitored passageway 14, and a monitored subject 16 which, in the embodiment of FIG. 1, is a patient not authorized to leave the premises. The monitored passageway 14 has a first region 18 in front of the passageway 14 and a second region or condition 20 within the passageway 14 or connected to it. The monitoring station 12 includes a first alert signal means 22 and a second warning or alarm signal means 24.

The alert system 10 is adapted to generate a first signal 22 when the patient 16 is within the first region 18 and to generate a second signal 24 when the patient 16 is in or actuates the second region or condition 20 by opening a door in the passageway 14, although it could be actuated by other means such as by the strength of a signal generated at that location or a pressure pad or photocell detector or infrared sensor or any other detector.

To provide an alert signal and/or an alarm signal, the monitor system 12 is electrically connected to the means for generating first and second signals either by a radio link or through conductors such as the conductors 32, 34, 36 and 38. The conductors 32 and 34 are electrically connected to the signal generators and to the first signaling means 22 and second signaling means 24 respectively.

In the embodiment of FIG. 1, the first signaling means 22 indicates an alert condition, which occurs when a monitored person 16 or object is at least within seven feet of the passageway 14, which is the region 18 although the distance may be set at a short distance such as five feet. In the preferred embodiment, the region 18 is four or five feet in front of the door on the side that the monitored persons normally are. The alarm signal 24 indicates that a person or object being monitored is within the first region 18 and the door has been opened so that both conditions are present.

While two separate signal generators are used in the embodiment of FIG. 1, a single signal generator may be used and may provide more than one indication, such as for example a flashing light or an intermittent audible sound for the alert condition and a steady light or steady sound for an alarm condition. Also, more than two regions may be used and different signals generated for the different regions. Moreover, more than one or two signals may be provided, such as for example: (1) a first signal being provided indicating that a monitored object or person is in front of the first region 18; (2) a second signal when the person is in the first region 18; and (3) a third signal being an alarm condition provided when the door is opened.

In one embodiment, a timer determines how long the person is in the first region 18. For example, a first signal may only be given after the monitored object or person is in the first region 18 for at least three seconds, although the time may be set for a different duration such as at least ten seconds or a first signal may only be given when the person being monitored is in the first region 18 for less than three seconds, a second signal when the person is in the region for more than three seconds and a third signal being an alarm condition.

In the embodiment of FIG. 1, a person being monitored carries a transmitter 30 which transmits continuously to provide the first signal 22 when the transmitter 30 is within the reception range of a receiver mounted to the passageway 14 such as at 20. When the door is opened, a second switch is closed to provide the second signal 24 so as to create an alarm condition.

In FIG. 1, an alternative signal generator is shown at 40 in the form of a television camera connected by conductors 36 and 38 to show the door on a screen 42 during the alert condition and provide a visual indication of the monitored person leaving when the doors open. In an embodiment using television, the television image is generally shown only when an object or person being monitored is within the region 18 and no monitoring is provided if persons not wearing the transducer 30 are in the region of the door. Also, an optional alarm 23 is shown mounted at the second region, which in the embodiment of FIG. 1 is a doorway, to provide a warning signal to the monitored person 16 at the same time an alert signal is being provided to the monitoring station 12.

While in the embodiment of FIG. 1 an active transmitter and the door mounted receiver are utilized together with a door switch, other transducer arrangements may be utilized. The embodiment of FIG. 1 is described herein in detail as an addition to the monitoring circuit disclosed in detail in U.S. Pat. No. 4,682,155, but it can be added to other types of monitoring units as well, such as for example the floor mounted antenna that detects a passive transponder carried by a monitored person disclosed in U.S. Pat. No. 4,095,214. Similarly; other kinds of transducers can be used such as photocells or pressure pads instead of a switch on the door disclosed in U.S. Pat. No. 4,682,155. Moreover, a single transmitter or transmitter and transponder combination may be used with one amplitude of received signal indicating that the object or person being monitored is within the first region and a higher amplitude indicating that the person is going through the passageway in a manner known in the art utilizing a threshold switch.

Generally, the first region 18 is in a range of less than seven feet from the passageway but more commonly is set for a shorter distance to reduce the number of times an alert signal is transmitted. An appropriate distance for such a reduction may be five feet.

In the operation of the preferred embodiment, when a person or object 16 being monitored passes through the first region 18 near the passageway 14, such as within seven feet of the passageway, an alert signal is given by the first signal means 22 on the monitoring station 12. Thus, persons at the central station will pay close attention waiting for an alarm signal. If the door is open, closing another switch, then the alarm signal 24 is illuminated. These signals are provided through conductors or by radio link. Moreover, in some embodiments, a video image may be provided by the wall mounted vide camera 40 that is also connected to the monitoring station 12.

In another embodiment, if the person or object 16 remains in the region 18 for less than three seconds, no alert signal is provided at the monitoring station 12. However, if a person being monitored stops in the first region 18 for more than three seconds, a signal is provided that illuminates an alert signal 22. The alarm signal is given by the second signal means 24 in this embodiment when the door is opened in the same manner as in the previous embodiment.

Figure 2:
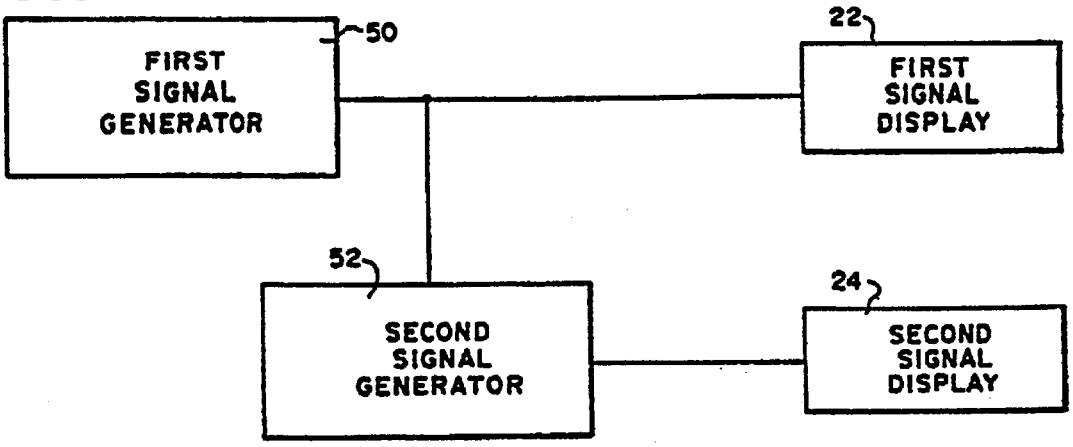
FIG. 2 is a block diagram of an electrical system that may be utilized in the embodiment of FIG. 1.

In FIG. 2, there is shown a block diagram of an electrical system for the embodiment of FIG. 1 having a first signal generator 50, a second signal generator 52, a first signal display 22 and a second signal display 24. The first signal generator 50 generates an electrical signal in the first region or condition 18 (FIG. 1) indicating the presence of an unauthorized person or object and transmits the signal to the first signal display 22, such as by illuminating a lamp on the monitoring station 12 (FIG. 1) to alert persons. The second signal generator 52 generates a second signal as the person attempts to go through the passageway such as by a switch on the door or a sensor at the door, which can be a photocell or a pressure sensor.

In some cases, such as where a continuous transmitter 30 (FIG. 1) is carried by a person 16 not authorized to leave, a single antenna in the passageway 14 picking up one amplitude of signal indicates that the person 16 is in the first region 18 and when it picks up a stronger amplitude signal, a threshold switch generates a second signal. The first signal may serve as the alert signal and the second signal as the alarm signal.

Figure 3:
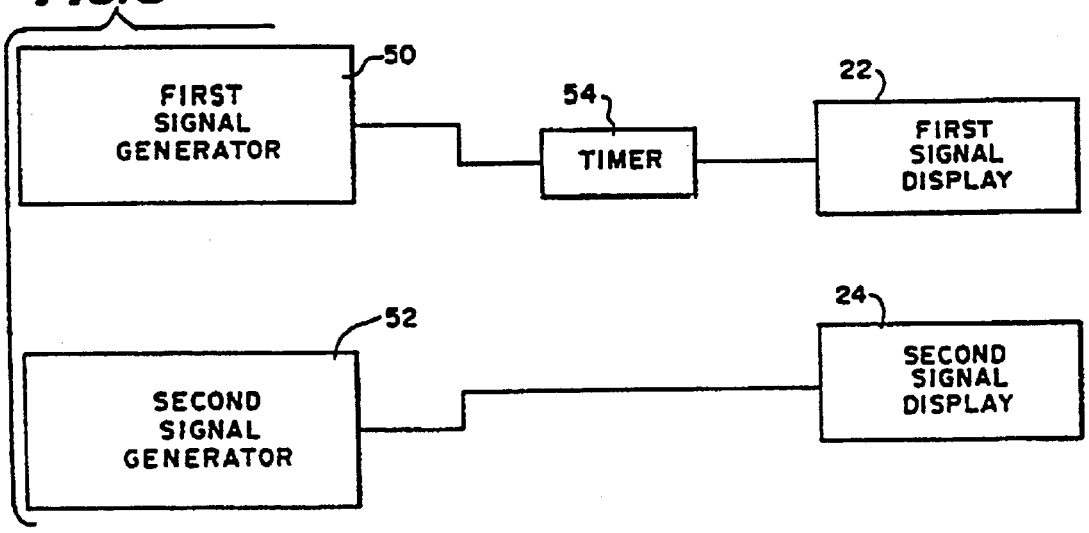
FIG. 3 is a block diagram of another embodiment of electrical system usable in the embodiment of FIG. 1.

In FIG. 3, there is shown a block diagram of another embodiment of electrical system for the embodiment of FIG. 1 having a first signal generator 50, a second signal generator 52, a timer 54, a first signal display 22 and a second signal display 24. The first signal generator 50 generates an electrical signal in the first region or condition 18 (FIG. 1) indicating the presence of an unauthorized person or object and transmits the signal to the timer 54, which may be a fixed delay.

After a fixed time delay, such as three seconds, the signal is applied to the first signal display 22 such as by illuminating a lamp on the monitoring station (FIG. 1) to alert persons. The second signal generator 52 generates a second signal 24 as the person attempts to go through the passageway such as by a switch on the door or a sensor at the door, which can be a photocell or a pressure sensor.

Figure 4:
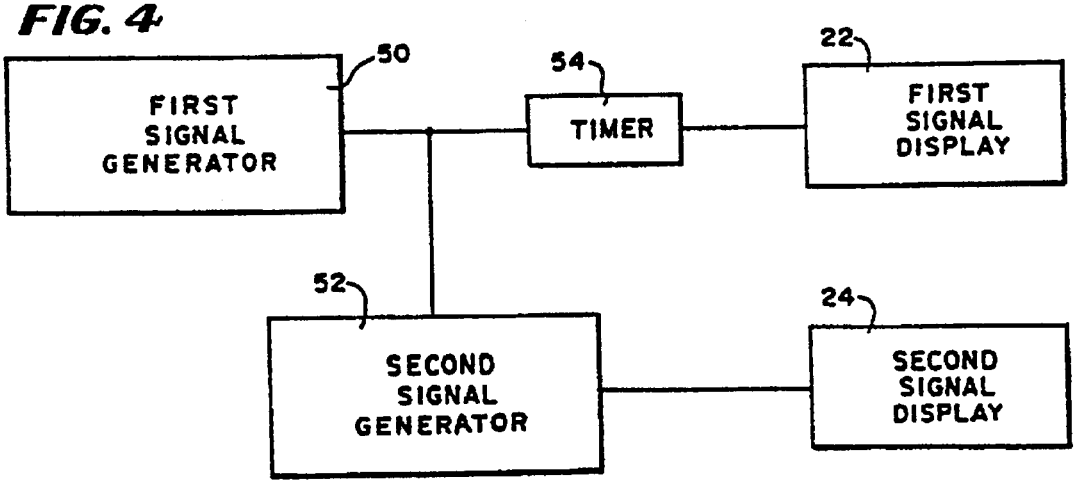
FIG. 4 is a block diagram of still another embodiment of electrical system usable in the embodiment of FIG. 1.

In FIG. 4, there is shown a block diagram of still another alert electrical system usable in the embodiment of FIG. 1. In the embodiment of FIG. 4, the first signal generator 50, which generates a signal when a person 16 (FIG. 1) is in the first region 18 (FIG. 1), applies the signal through the timer 54 to the first signal display 22 in the same manner as in the embodiment of FIG. 3. However, it also applies the signal to the second signal generator 52, which signal generator does not pass the signal on unless the person 16 can pass through the doorway. In the preferred embodiment, the second signal generator 52 is a switch mounted at the door which closes to permit passage of a signal from the first signal generator 50 to the second signal display 24 only when the door is open.

In FIG. 5, there is shown a partly schematic and partly block circuit diagram of the embodiment of alert system of FIG. 2 showing the first signal generator 50 generally as indicated at 50, the first signal display 22, the second signal generator 52, and the second signal display at 24. This circuit is substantially the same as that of the aforementioned U.S. Pat. No. 4,682,155 but has an appropriate alert signal circuit added.

In the embodiment of FIG. 5, ferrite inductors 74 and 76 including ferrite cores 78 and 80 and respective coils 82 and 84 are mounted perpendicular to each other as shown. The coil 82 on the ferrite inductor 74 is connected to jack 86 for an external sensor and the coil 84 of the ferrite inductor 76 is shown connected directly to a superheterodyne AM radio receiver 53. Other types of receivers including tuned radio frequencies as well as FM receivers could also be used.

To generate a first signal when the transmitter 30 (FIG. 1) is in the first region 18 and thus, is within range of the superheterodyne receiver, the output of the superheterodyne receiver 53 is applied to primary coil 88 of transformer 90 which has its secondary winding 92 grounded on one side and connected on the opposite side to the input of a circuit which includes a pair of oppositely polarized diodes 94 and 96 which are grounded as shown. The nongrounded side of the secondary winding 92 is also connected to one side of an optional circuit 98 for preventing damage due to transient conditions and which includes capacitor 100 connected in series with inductor or choke 102. The secondary winding 92 is also connected through another capacitor 104 to the input of a two-stage audio filter circuit 106 which is constructed and adjusted to have an operating range between about 770 hz and 990 hz.

To provide an alarm signal when the door is open, the output of the two-stage audio filter circuit 106 is connected through resistor 108 to base element 110 of transistor 112. The transistor 112 is connected to a base-to-emitter biasing circuit formed by parallel connected resistor 114 and capacitor 116 which are connected to a DC potential terminal 118 which may be from a battery or from the output of a rectifier circuit.

A collector 120 of the transistor 112 is connected through another resistor 122 to one side of relay circuit shown as including a relay coil 124 connected in parallel with diode 126 and the opposite sides of which are grounded. The relay coil 124 operates a relay contact 128 which is connected into a circuit between DC potential at terminal 130 and an output circuit which includes an audio beeper 132 and a transmitter circuit 72. The diode 126 is included to prevent back EMFs or voltages from damaging the transistor 112.

The high voltage side of the relay coil 124 is also connected through reset pushbutton switch 134, resistor 136 and grounded diode 138. This circuit has a connection through the normally open side of the relay contact 128 to DC voltage terminal 130 when the relay is energized. When the pushbutton switch 134 is actuated, it disconnects power from the relay coil 124 denergizing it and opening the relay contact 128.

One side of the beeper 132 is connected to another DC voltage terminal 140 and the opposite side is connected to collector electrode 141 of transistor 142. An emitter 143 of the transistor 142 is connected through resistor 145 to one side of the relay contact 128. Application of positive voltage to the base of the transistor 142 turns on the transistor 142 to conduct and in so doing, energizes the beeper 132. The beeper 132 is therefore energized whenever a resident equipped with a transmitter is trying to pass through an unauthorized doorway and in so doing, causes a signal to be received by the receiver 53 to energize the relay 124. The radio transmitter 72 is also activated at the same time as the beeper 132 to transmit a signal to other nurse's stations if there are such in the institution. This is done to make the alarm more general and, if necessary, to keep track of alarms. The transmitter 72 is connected to the DC source terminal 130 through another resistor 146 connected as shown.

To provide an alert signal, the input of the first signal display 22 is connected through conductor 150 to the output of the filter 106 and the output of the filter 106 is connected through conductor 152 to the cathode of a 1N4002 diode 156 through a 100 ohm resistor [154]*153*. The anode of the diode 156 is electrically connected to the base of transister 144 through the resistor 145. In the embodiment of FIG. 4, the timer 54 is connected in circuit between the first signal display 22 and the filter 106 of the signal generator 50 to receive the output of the filter 106 and time delay it for a preset period of time.

Figure 6:
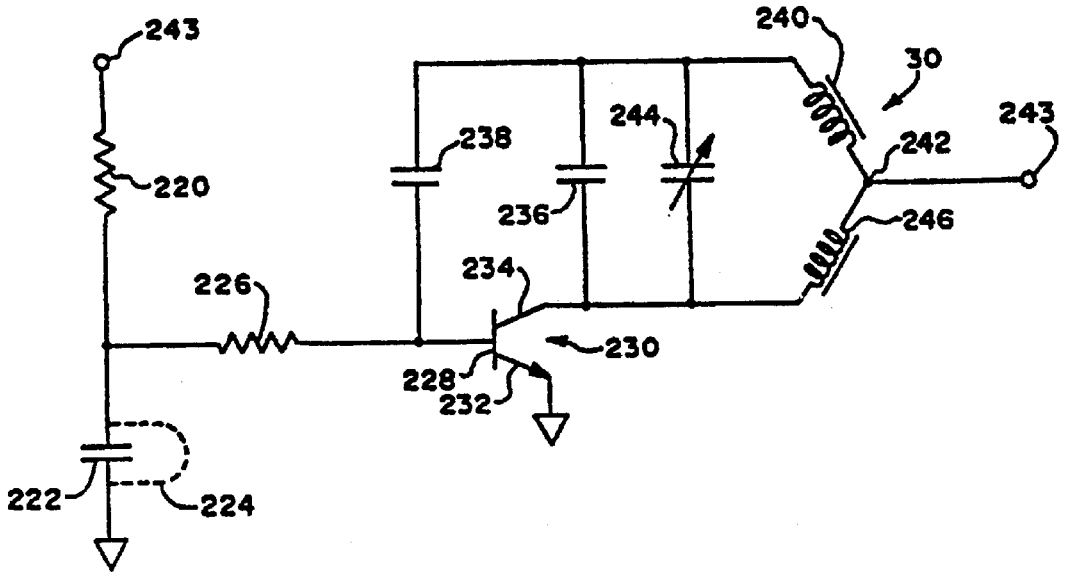
FIG. 6 is a schematic circuit diagram of a portion of an embodiment of transmitter usable in the embodiment of FIG. 1.

In FIG. 6, there is shown a schematic circuit diagram of the transmitter module 30 which transmits a radio frequency signal preferably at or about 510 kilohertz which signal is audio modulated at a frequency in the range from about 770–990 hertz. Such a signal is outside the low end of the broadcast band. The transmitter module 30 includes an input resistor 220 connected to a DC source and to ground through capacitor 222. A wire loop 224, shown in dotted line, is connected across the capacitor 222 with the exposed end of the loop 224 extending from a plastic carrying case. When the device is constructed and encased, the wire loop 224 forms a short circuit across the capacitor 222 to reduce the flow of current across from the battery and reduce the drain of power.

The transmitter module 30 includes another input resistor 226 connected on one side to the connection between the input resistor 220 and the capacitor 222 and has its opposite side connected to base element 228 of the transistor 230. An emitter 232 of the transistor 230 is grounded and a collector 234 is connected to one side of a capacitor 236. The transistor base element 228 is also connected to one side of another capacitor 238, and the capacitors 236 and 238 have their opposite sides connected together as shown. This common connection is connected to one side of an inductor 240, the opposite side of which is connected to a 1.5 volt battery connection 243. The inductor 240 is also connected to one side of a variable tuning capacitor 244 which has its opposite side connected to the collector electrode 234 of the transistor 230. This connection is also made to one side of a second inductor 246 which has its opposite side connected to the 1.5 volt battery connection 243. The inductors 240 and 246 are preferably oriented to by physically located at or near right angles to each other in order to make the RF radiation pattern of the transmitted signal more uniform and omnidirectional and to reduce null conditions.

Figure 8:
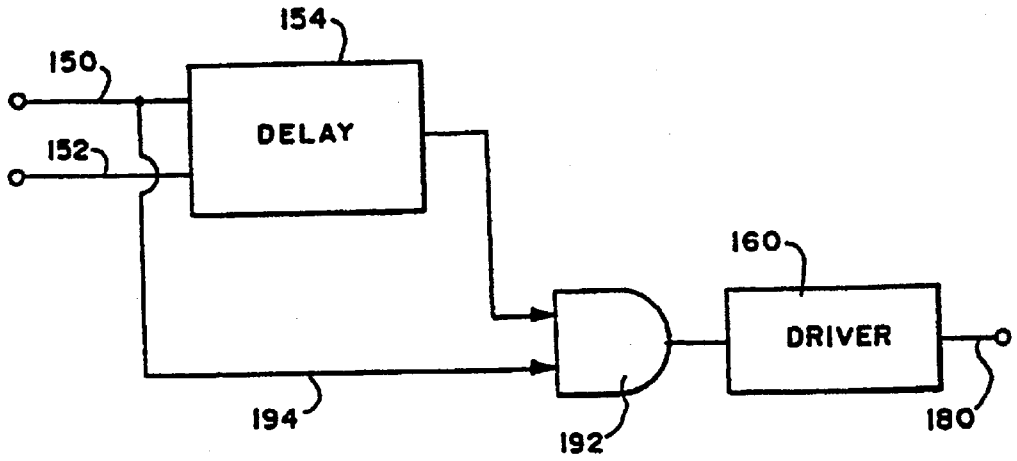
FIG. 8 is a block diagram of another embodiment of a driver circuit for an alarm that is usable in the embodiment of FIG. 5.
Figure 7:
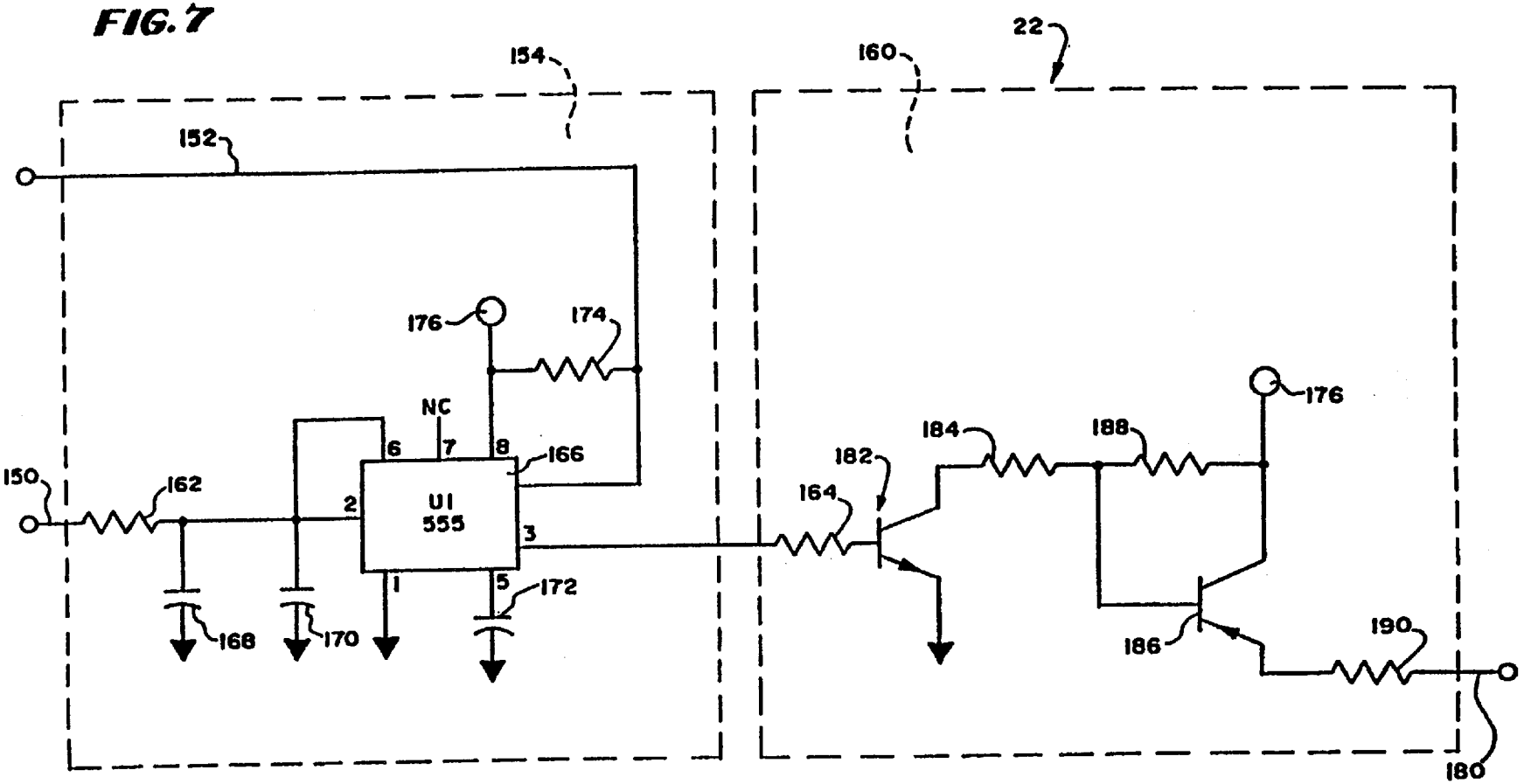
FIG. 7 is a schematic circuit diagram of a driver circuit for an alarm that is usable in the embodiment of FIG. 5.

In FIG. 7, there is shown a schematic circuit diagram of the driver circuitry for the display 22 (FIG. 1) having a filter or timer 154 connected to a current driver shown generally at 160 for the lamp 22 that serves as the alert lamp. In the preferred embodiment, the filter or timer 54 is a standard UI 555 timer circuit set for only one or two microseconds delay and serves as a filter against transient or other noise. In another embodiment shown in FIG. 8, the timer 154 can be set for a longer time such as three seconds and be connected in parallel with a conductor 194 between the input conductors 150 and 152 to a different one of the two inputs of the two input AND gate 192 to energize the driver 160 only after the preset time period for use in the embodiments of FIGS. 3 and 4.

The input of the timer or filter 154 is electrically connected to conductor 150 to receive the output signal from the audio filter 106 (FIG. 5) through a 100 kilohm resistor 162 and has its output electrically connected through a 10 kilohm resistor 164 within the lamp driver circuit 160. In this circuit, the UI555 timer 166 has its second and sixth pins electrically connected through a parallel filter including capacitors 168 and 170 to conductor 150 through the resistor 162, having pins 5 grounded through a 0.01 microfarad capacitor 172 and its 8 pin electrically connected to a positive 12 volt source of supply and to conductor 152, conductor 152 being electrically connected through a 10K resistor 174 to the source of the positive 12 volts 176.

To drive a lamp electrically connected to conductor 180, resistor 164 is electrically connected to the base of a 2N2222 NPN transistor 182 having its emitter grounded and its collector electrically connected through a 1 kilohm resistor 184 to the base of a 2N2907 PNP at transistor 186. The positive 12 volt source 176 is electrically connected to the base through a 47 kilohm resistor 188 and the emitter of the transistor 186 is electrically connected to the conductor 180 through an output resistor 190 selected to cooperate with the pre-alarm lamp. The value of resistance will depend on the selection of the lamp or other enunciator.

From the above description, it can be understood that the alert system of this invention has several advantages, such as: (1) it provides a warning that will cause persons monitoring a passageway to be alert for a possible exit of an unauthorized person or object; (2) it can compensate to some extent for a malfunction of the alarm condition because persons will be put on guard by the alert condition; and (3) it is inexpensive and reliable, utilizing mainly parts and equipment already present in many existing monitoring systems to provide the extra alert condition.

Although a preferred embodiment of the invention has been described with some particularity, many modifications and variations in the preferred embodiment are possible without deviating from the invention. Therefore, it is to be understood that, within the scope of the appended claims, the invention may be practiced other than as specifically described.

What is claimed is:

1. A method of generating an alert signal comprising the steps of:

generating a first signal when an unauthorized subject is in a first region within seven feet of a monitored passageway;

generating a second signal upon satisfaction of a second condition that indicates the likelihood of the subject passing through the passageway;

displaying a first indication if the first signal is present and a second indication if the second condition occurs;

the step of generating a first signal including the step of transmitting a signal from the subject to a receiver.

2. A method in accordance with claim 1 in which the step of generating the second signal includes the step of generating a second signal whenever a door to the passageway is open.

3. A method in accordance with claim 1 in which the step of generating the second signal includes the step of generating a second signal whenever an infrared detector senses a person at the passageway.

4. A method in accordance with claim 1 in which the step of generating second signal includes the step of generating the second signal whenever a person is sensed by a pressure pad in a first locality in front of the passageway.

5. A method in accordance with claim 1 in which the step of generating a first signal includes the step of transmitting a signal from a location adjacent to the passageway.

6. A security system comprising:

first means for generating a first signal when an unauthorized subject is within seven feet of a passageway;

second means for generating a second signal upon satisfaction of a second condition that indicates the likelihood of the subject passing through the passageway; and third means for displaying a first indication if the first signal is generated and for displaying a second indication upon the generation of the second signal;

said first means for generating a first signal including means for transmitting a signal from the subject to a receiver.

7. A security system in accordance with claim 6 in which the second means for generating a second signal includes means for generating a second signal whenever a door to the passageway is open.

8. A security system in accordance with claim 6 in which the second means comprises means for generating a second signal whenever an infrared detector senses a person at the passageway.

* * * * *